(12) United States Patent
Maruyama et al.

(10) Patent No.: US 6,720,378 B2
(45) Date of Patent: Apr. 13, 2004

(54) RUBBER COMPOSITION HAVING IMPROVED WET SKID RESISTANCE AND ROLLING RESISTANCE

(75) Inventors: Tsukasa Maruyama, Hiratsuka (JP); Kazunori Ishikawa, Hiratsuka (JP); Yoshiaki Kirino, Hiratsuka (JP)

(73) Assignee: Yokohama Rubber Co., Ltd, Hiratsuka (JP)

( * ) Notice: Subject to any disclaimer, the term of this patent is extended or adjusted under 35 U.S.C. 154(b) by 0 days.

(21) Appl. No.: 10/378,811

(22) Filed: Mar. 5, 2003

(65) Prior Publication Data

US 2003/0158298 A1 Aug. 21, 2003

Related U.S. Application Data

(62) Division of application No. 09/923,882, filed on Aug. 8, 2001, now abandoned.

(30) Foreign Application Priority Data

Aug. 24, 2000 (JP) ........................................ 2000-253233
Mar. 13, 2001 (JP) ........................................ 2001-070996

(51) Int. Cl.$^7$ ................................................ C08K 3/04
(52) U.S. Cl. .......................... 524/495; 524/84; 524/99; 524/257; 524/424; 152/450
(58) Field of Search ........................... 524/424, 84, 99, 524/257, 495; 152/450

(56) References Cited

U.S. PATENT DOCUMENTS

| | | | | | |
|---|---|---|---|---|---|
| 3,335,020 A | * | 8/1967 | Aboytes et al. | ............. | 106/476 |
| 4,764,547 A | * | 8/1988 | Hatanaka et al. | ............ | 523/215 |
| 5,900,029 A | * | 5/1999 | Belmont et al. | ............... | 8/550 |
| 5,999,780 A | * | 12/1999 | Mort et al. | ................... | 399/266 |
| 6,008,272 A | * | 12/1999 | Mahmud et al. | ............ | 523/351 |
| 6,172,154 B1 | * | 1/2001 | Brown et al. | ................ | 524/495 |
| 6,458,883 B1 | * | 10/2002 | Takashima et al. | ......... | 524/495 |

FOREIGN PATENT DOCUMENTS

| JP | 08-297295 | 11/1996 |
|---|---|---|
| JP | 08-333523 | 12/1996 |
| JP | 09-278942 | 10/1997 |

OTHER PUBLICATIONS

"Promoters for the Reaction of Rubber with Carbon Black", DOAK et al, *Rubber Chem. Technol.*, vol. 28, pp. 895–905 (1995).
"NR Vulcanisates with Improved Dynamic Properties", PAYNE et al, *J. Rubb. Res. Inst. Malaya*, vol. 22, pp. 275–288 (1969).
"Chemical Promotion of NR and SBR", Walker et al, *Rubber Age*, vol. 90, No. 6, Mar. 1962, pp. 925–931.
"The Synthesis and Spectral Characteristics of Some Nitrosoanilines and Their Possible Mode of Action as Curing Agents for Various Types of Rubbers", POTTS et al, *Rubber Chem. Technol.*, vol. 47, pp. 289–302 (1974).
"Benzofuroxans as Rubber Additives", GRAVES, *Rubber Chem. Technol.*, vol. 66, pp. 61–72 (1993).
"Novel Carbon Black/Rubber Coupling Agent", Yamaguchi et al, *Kautsch. Gummi. Kunstat*, vol. 42, pp. 403–409 (1989).
"A New Carbon Black–Rubber Coupling Agent to Improve West Grip and Rolling Resistance of Tires", Gonzalez et al, *Rubber Chem. Technol.*, vol. 69, pp. 266–272 (1996).
"Enzymatically Synthesized Conducting Polyaniline", Liu et al, *J. Am. Chem. Soc.*, vol. 121, pp. 71–78 (1999).
"Novel Synthesis of Polyaniline Using Iron(III) Catalyst and Ozone", Toshima et al, *Chem. Letter. 2000*, pp. 1428–1429.
"Novel Synthesis of Electroconducting Polymers from Simple Monomers with Transition Metal Complex Catalysts", Toshima, *Makromol. Chem., Macromol. Symp.*, vol. 59, pp. 123–134 (1992).

* cited by examiner

Primary Examiner—David W. Wu
Assistant Examiner—Henry S Hu
(74) Attorney, Agent, or Firm—Arent Fox, PLLC

(57) ABSTRACT

A rubber composition comprising (i) 100 parts by weight of a rubber and (ii) 10 to 180 parts by weight of a composite composed of an oxidative condensate obtained by oxidative condensation of a π-electron aromatic compound and carbon black and a pneumatic tire using the same as a tire tread.

8 Claims, No Drawings

RUBBER COMPOSITION HAVING IMPROVED WET SKID RESISTANCE AND ROLLING RESISTANCE

This is a Division of application Ser. No. 09/923,882 filed Aug. 8, 2001 now abandoned. The disclosure of the prior application is hereby incorporated by reference herein in its entirety.

BACKGROUND OF THE INVENTION

1. Field of the Invention

The present invention relates to a rubber composition, more specifically, it relates to a rubber composition containing a rubber and compounding agents easy to produce and having an excellent wet skid resistance and low rolling resistance.

2. Description of the Related Art

Along with the improvement in performance and improvement in functions of automobiles, demands for the high performance of tires have been increased from year to year. As one of these, there is a strong demand for development of a tire having a strong grip on wet roads, that is, a good wet skid resistance, and providing also a low fuel consumption property. To obtain a low fuel consumption tire, it is necessary to make the tire small in hysteresis loss. However, if the hysteresis loss is reduced, the rolling resistance becomes smaller and the grip is reduced, and therefor, problems arise in driving safety. On the other hand, if the wet skid resistance is improved in order to increase the grip, the rolling resistance, that is, the hysteresis loss, becomes larger and the tire is made poor in fuel consumption property.

Due to this antimonic relationship between the wet skid resistance and the rolling resistance, active researches have been made to satisfy both demands for tire use rubber compositions Various compounding agents for rubber compositions have been reported for rubber compositions providing a large wet skid resistance in spite of a low rolling resistance.

As such compounding agents for improving the dynamic behavior, nitroso-based compounds have been reported. However, nitrosoamine compounds suffer from the problem of a deleterious effect on the human body. At present, the commercial, production thereof has been stopped. (See Kenneth W. Doak et al., *Rubber Chem. Technol.*, 28, 895 (1995), Payne, A. R. et al.; *J. Rubber Res. Inst. Malaya*, 22, 275 (1969), Walker, L. A. et al., *Rubber Age* 90, 925 (1962), Patts, K. T. et al., *Rubber Chem. Technol.*, 47, 289 (1974), Daniel F. Graves, *Rubber Chem. Technol.*, 66, 61 (1993).)

Further, dinitroamine-based compounds have been reported as another compounding agents. However, it is reported that, while the improvement in the dynamic behavior as mentioned above is recognized for polyisoprene-based rubber, it is not recognized for butadiene-based rubber such as SBR. (See Yamaguchi, T. et al.; *Kautsch. Gummi. Kunstst.*, 42, 403 (1989).)

As compounding agents exhibiting the above effect on polyisoprene-based rubber and butadiene-based rubber, dialkylamino group-containing sulfur compounds (see Japanese Unexamined Patent Publication (Kokai) No. 9-278942) and aminobenzenesulfonylazide (see Gonzalez, L. et al.; *Rubber Chem. Technol.*, 69, 266 (1996)) have been reported. However, these compounds have defects such as the many production steps and the complicated production process and, in the case of the latter azide compounds, the use, as a synthesis starting material of sodium azide, which has explosiveness and requires caution in handling.

SUMMARY OF THE INVENTION

Accordingly, an object of the present invention is to provide a rubber composition containing a rubber and easy-to-produce compounding agents to provide an excellent wet skid resistance and a low rolling resistance.

In accordance with the present invention, there is provided a rubber composition comprising (i) 100 parts by weight of a rubber and (ii) 10 to 180 parts by weight of a composite composed of an oxidative condensate obtained by oxidative condensation of a π-electron aromatic compound and carbon black.

PREFERRED EMBODIMENT FOR CARRYING OUT THE INVENTION

It must be noted that, as used in the specification and the appended claims, the singular forms "a," "an" and "the" include plural referents unless the context clearly dictates otherwise.

According to the present invention, by compounding a composite (hereinafter sometimes referred to as the "composite" according to the present invention) composed of (i) an oxidative condensate obtained by oxidative condensation of a π-electron aromatic compound (hereinafter sometimes referred to as the "oxidative condensate" according to the present invention) and (ii) carbon black to a rubber, a good wet skid resistance and low rolling resistance can be obtained. Further, the composite of the present invention is a compounding agent having an extremely high industrial applicability, since it is easy to produce.

The π-electron aromatic compound useable in the present invention is not particularly limited so long as it can form the oxidative condensate of the present invention with an oxidizing agent. The preferable compounds are, for example, aniline, naphthylamine, phenylenediamine, naphthylenediamine, triaminobenzene, triaminonaphthalene, pyrrole, indole, carbazole, thiophene, selenophene, imidazole, furan, benzene, azulene, pyrene, triphenylene, fluorene, benzenedithiol, diphenyldisulfide, phenol, diethynylbenzene, and their derivatives. As the derivatives, for example, compounds having at least one substituent group such as a $C_1$ to $C_{30}$ alkyl group, $C_1$ to $C_{30}$ alkoxy group, $C_2$ to $C_{30}$ alkylenoxide group, sulfonic acid group, $C_2$ to $C_{30}$ alkylene sulfonic acid group, hydroxyl group, nitro group, amino group, cyano group (di) alkylamino group (i.e., $C_1$ to $C_{30}$ alkyl group), which are introduced into their aromatic rings may be mentioned. Further, the above compounds may be used alone or in any mixture thereof.

The oxidizing agent usable in the present invention is not particularly limited so long as it can oxidatively condense the π-electron aromatic compound and form the oxidative condensate of the present invention. The preferable oxidizing agents are, for example, persulfates such as ammonium persulfate and potassium persulfate; trivalent ferric salts such as iron (III) chloride, iron (III) sulfate, and iron (III) nitrate; bivalent copper salts such as copper (II) chloride; permanganates such as sodium permanganate and potassium permanganate; bichromates such as potassium bichromate and sodium bichromate; peroxides such as hydrogen peroxide and peracetic acid; oxygen; ozone; oxidizing enzymes (for example, those illustrated in Liu, W. et al.; *J. Am. Chem. Soc.* 1999, 121, 71). Further, redox-based initiators such as those composed of divalent ferrous salts and hydrogen peroxide or Lewis acids (e.g., aluminum trichloride, iron trichloride, etc.) and oxidizing agents (e.g., copper salts such as cuprous chloride, cupric chloride, etc.), air (oxygen), etc.) in combination may also be used (for example, those illustrated in Toshima, N. et al.; *Chem. Lett.* 2000, 1428 or Toshima, N.; Makromol. Chem., *Macromol. Symp.* 1992, 59, 123). The above oxidizing agents may be used alone or in any mixture thereof. The addition amount of the oxidizing agent is preferably 0.005 to 20, more preferably 0.01 to 10, in terms of molar ratio with respect to the π-electron aromatic compound (oxidizing agent/π-electron aromatic compound).

As the oxidative condensate of the present invention, it is possible to use those previously obtained by oxidative condensation of the π-electron aromatic compound or to perform oxidative condensation after bonding the π-electron aromatic compound to the carbon black, or to be bonded to the carbon black simultaneously with the oxidative condensation. The oxidative condensate is not particularly limited so long as oxidative condensation of the above π-electron aromatic compound can be obtained. Preferably, those obtained by oxidative condensates of aniline, pyrrole, thiophene and the derivatives thereof are exemplified.

The π-conjugated polymer was mentioned as an example of the oxidative condensate of the present invention. This is a polymer having a π-conjugated system along the polymer chain and is known to exhibit electroconductivity upon doping. Examples of such π-conjugated polymers are polyaniline, polythiophene, polypyrrole, poly(p-phenylene), poly(p-phenylenevinylene), and derivatives thereof. Among these, those having the formulas given below, that is, polyaniline or its derivatives poly(2-methyl-aniline), polythiophene, polypyrrole, poly(p-phenylene), et c. are preferable in view of the general applicability and superior economicalness.

a nitrogen adsorption specific area ($N_2SA$) of 20 to 200 $m^2/g$ is preferable in view of the good processability and reinforcing property when compounded into the rubber. For example, SAF, ISAF, HAF, FEF, and GPF grade carbon black may be mentioned.

The composite of the present invention is composed of the oxidative condensate obtained by oxidative condensation of a π-electron aromatic compound and carbon black physically or chemically bonded, wherein the oxidative condensate should be present at least on the surface of the composite.

As the production process of the composite of the present invention, for example, (1) the method of treating the surface of carbon black by a solution containing the π-electron aromatic compound and an inorganic acid and/or organic acid, then treating the surface by a solution containing an oxidizing agent, (2) the method of treating the surface of the carbon black by a solution containing the π-electron aromatic compound and an inorganic acid and/or organic acid, then treating the surface by a solution containing an oxidizing agent and an inorganic acid and/or organic acid, (3) the method of treating the surface of the carbon black by a solution containing the π-electron aromatic compound and an inorganic acid and/or organic acid and oxidizing agent, (4) the method of treating the surface of the carbon black by a solution containing an inorganic acid and/or organic acid and oxidizing agent, then treating the surface by a solution containing the π-electron aromatic compound and an inorganic acid and/or organic acid, (5) the method of treating the surface of the carbon black by a solution containing an inorganic acid and/or organic acid and oxidizing agent, then treating the surface under an atmosphere of the vapor phase of the π-electron aromatic compound, (6) the method of treating the surface of the carbon black by a solution containing an oxidative condensate, (7) the method of dispersing and mixing carbon black with the oxidative condensate, etc. may be mentioned.

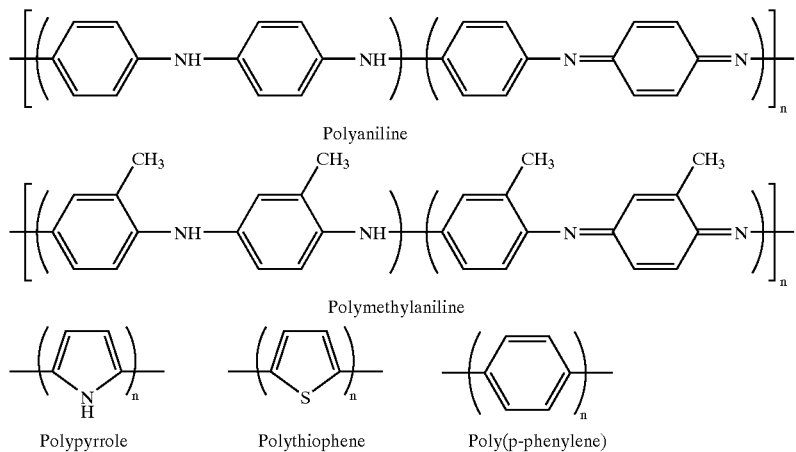

wherein, n is 1 to 1000 in each formula.

The oxidative condensate of the present invention is preferably bonded in the composite of the present invention in an amount of 0.01 to 30% by weight, more preferably 0.05 to 25% by weight. By making it at least 0.01% by weight, a greater effect of the present invention is obtained, while even if over 30% by weight, a further effect is difficult to obtain.

The carbon black usable in the present invention is not particularly limited so long as it is a carbon black which is ordinarily compounded into rubber, but carbon black having The inorganic acid and/or organic acid usable in the present invention may be any acid, but specifically a protonic acid such as sulfuric acid, hydrochloric acid, nitric acid, perchloric acid, or fluoroboric acid or their salts; carboxylic acids such as acetic acid, formic acid, and benzoic acid and their salts; phenols such as phenol, nitrophenol, and cyanophenol and their salts; organic sulfonic acids such as benzenesulfonic acid, p-toluenesulfonic acid, p-dodecylbenzenesulfonic acid, alkylnaphthalenesulfonic acid, anthraquinonesulfonic acid, alkylsulfonic acid, dodecylsulfonic acid, camphorsulfonic acid, dioctylsulfosuccinic acid, copper phthalocyanine tetrasulfonic acid, porphyrin tetrasulfonic acid, polystyrenesulfonic acid, polyvinylsulfonic acid, and naphthalenesulfonic acid condensate and their salts; phosphoric acid esters such as propylphosphoric acid ester, butylphosphoric acid ester, hexylphosphoric acid ester, polyethylene oxide dodecyletherphosphoric acid ester, and polyethylene oxide alkyletherphosphoric acid ester and their salts; and sulfuric acid esters such as laurylsulfuric acid ester, cetylsulfuric acid ester, stearylsulfuric acid ester, and laurylethersulfuric acid ester and their salts may be mentioned. Preferably, hydrochloric acid, sulfuric acid, and organic sulfonic acids such as benzenesulfonic acid, p-toluenesulfonic acid, p-dodecylbenzenesulfonic acid, alkylnaphthalenesulfonic acid, alkylsulfonic acid, dodecylsulfonic acid, camphorsulfonic acid, dioctylsulfosuccinic acid, polystyrenesulfonic acid, polyvinylsulfonic acid, and naphthalenesulfonic acid condensate and their salts may be mentioned. These inorganic acids and/or organic acids may be used alone or in any mixture thereof. The addition amount of the inorganic acid and/or organic acid is preferably 0.001 to 15, more preferably 0.005 to 10, in terms of molar ratio to the π-electron aromatic compound.

The solvent used when producing the composite of the present invention is not particularly limited so long as it can oxidize and polymerize the π-electron aromatic compound. Specifically, water; alcohols such as methanol, ethanol, and propanol; ketones such as acetone and methylethylketone; nitrites such as acetonitrile and benzonitrile; N,N-dimethylformamide, dimethylsulfoxide, N-methylpyrrolidone, and propylene carbonate may be mentioned. Preferably, water or a solvent containing water is used.

The reaction temperature of the oxidative condensation reaction is not particularly limited, but is preferably −20 to 400° C., more preferably not more than 300° C. Even if the reaction temperature is more than 400° C., a more improved effect is difficult to obtain.

The composite of the present invention containing an inorganic acid and/or organic acid and produced by the above production processes may be directly compounded into rubber, but it is also possible to process the composite of the present invention to remove the inorganic acid and/or organic acid and then compound it into the rubber. The method of removing the inorganic acid and/or organic acid from the composite of the present invention is not particularly limited. All sorts of known methods are usable. In general, it is sufficient to bring the composite of the present invention including the inorganic acid and/or organic acid into contact with a basic substance. It is possible to form the composite of the present invention, then directly add the basic substance to the reaction mixture containing the composite or isolate the composite of the present invention once, then the basic substance may be applied to the composite of the present invention in a vapor phase or liquid phase. As the basic substance, a primary, secondary, or tertiary alkylamine (for example, mono-, di-, or tri-ethylamine), a hydrazine and its derivatives, an alkali metal hydroxide such as sodium hydroxide and potassium hydroxide, an alkali metal carbonate such as sodium carbonate, potassium carbonate, sodium hydrogencarbonate, or potassium hydrogencarbonate; ammonia; etc. may be mentioned.

The composite of the present invention thus obtained may be dried at room temperature or may be dried under heating. The drying temperature is preferably 10 to 350° C., more preferably 25 to 300° C.

As the process of production when using a π-conjugated polymer for the composite of the present invention, there are (1) the method of adding an oxidizing agent to a solution containing a monomer for forming the π-conjugated polymer and a dopant and having carbon black dispersed therein, (2) the method of adding a monomer for forming the π-conjugated polymer to a solution containing an oxidizing agent and dopant and having carbon black dispersed therein, (3) the method of adding an oxidizing agent and dopant to a solution containing a monomer for forming the π-conjugated polymer and having carbon black dispersed therein, (4) the method of adding carbon black to a solution containing a monomer for forming the π-conjugated polymer, a dopant, and an oxidizing agent, (5) the method of forming a π-conjugated polymer in a solution containing a monomer for forming the π-conjugated polymer, a dopant, and an oxidizing agent and treating the surface of carbon black with the solution containing the π-conjugated polymer, etc. may be mentioned.

The monomer for forming the π-conjugated polymer is a compound having a conjugated double bond in the molecular structure thereof. Examples of such monomers are aniline, naphthylamine, phenylenediamine, naphthylenediamine, triaminobenzene, triaminonaphthalene, pyrrole, thiophene, furan, benzene, and their derivatives. As the derivatives, for example, compounds having at least one substituent group selected from a $C_1$ to $C_{30}$ alkyl group, $C_1$ to $C_{30}$ alkoxy group, $C_1$ to $C_{30}$ alkylenoxide group, sulfonic acid group, $C_2$ to $C_{30}$ alkylene sulfonic acid group. Further, the above monomers may be used alone or in any mixture thereof. Other monomers may also be mixed in up to amounts not inhibiting the manifestation of the effect of the present invention.

The oxidizing agent usable in the present invention is not particularly limited so long as it has polymerizing activity with respect to the above monomer. Those mentioned above are also exemplified. The addition amount of the oxidizing agent is preferably 0.005 to 20, more preferably 0.01 to 10, in terms of molar ratio with respect to the monomer (oxidizing agent/monomer).

The dopant used when forming the composite of the present invention is not particularly limited. Any dopant may be used so long as it is able to dope a π-conjugated polymer compound. Specifically, halogen compounds such as a compound of iodine, bromine, chlorine, or iodine; protonic acids such as sulfuric acid, hydrochloric acid, nitric acid, perchloric acid, or fluoroboric acid; various types of salts of these protonic acids; Lewis acids such as aluminum trichloride, iron trichloride, molybdenum chloride, antimony chloride, arsenic pentafluoride, and antimony pentafluoride; organic acids such as acetic acid, trifluoroacetic acid, benzenesulfonic acid, and p-toluenesulfonic acid; polymer acids such as polyethylenesulfonic acid, polyethylenecarboxylic acid, polyacrylic acid, and polystyrenesulfonic acid; etc. may be mentioned.

Among the dopants, those preferred are protonic acids such as sulfuric acid, hydrochloric acid, nitric acid, perchloric acid, or fluoroboric acid, various types of salts of thereof, carboxylic acids such as acetic acid, formic acid, and benzoic acid and their salts; phenols such as phenol, nitrophenol, and cyanophenol and their salts; organic sulfonic acids such as benzenesulfonic acid, p-toluenesulfonic acid, p-dodecylbenzenesulfonic acid, alkylnaphthalenesulfonic acid, anthraquinonesulfonic acid, alkylsulfonic acid, dodecylsulfonic acid, camphorsulfonic acid, dioctylsulfosuccinic acid, copper phthalocyanine tetrasulfonic acid, porphyrin tetrasulfonic acid, polystyrenesulfonic acid, polyvinylsulfonic acid, and naphthalenesulfonic acid condensate and their salts; phosphoric acid esters such as propylphosphoric acid ester, butylphosphoric acid ester, hexylphosphoric acid ester, polyethyleneoxide dodecylether phosphoric acid ester, and polyethyleneoxide alkylether phosphoric acid ester and their salts; and sulfuric acid esters such as laurylsulfuric acid ester, cetylsulfuric acid ester, stearylsulfuric acid ester, and laurylethersulfuric acid ester and their salts may be mentioned. Preferably, organic sulfonic acid salts such as benzenesulfonic acid, p-toluenesulfonic acid, p-dodecylbenzenesulfonic acid, alkylnaphthalenesulfonic acid, alkylsulfonic acid, dodecylsulfonic acid, camphorsulfonic acid, dioctylsulfosuccinic acid, polystyrenesulfonic acid, polyvinylsulfonic acid, and naphthalenesulfonic acid condensate and their salts may be mentioned.

Further, these dopants may be used alone or in any mixture thereof. The addition amount of the dopant is preferably 0.001 to 15, more preferably 0.005 to 10, in terms of molar ratio to the monomer (dopant/monomer).

The solvent used when producing the composite of the present invention is not particularly limited so long as it can oxidatively polymerize the monomer, but specifically water; alcohols such as methanol, ethanol, and propanol; ketones such as acetone and methylethylketone; nitrites such as acetonitrile and benzonitrile; N,N-dimethylformamide, dimethylsulfoxide, N-methylpyrrolidone, and propylene carbonate may be preferably used mentioned. More preferably, water or a solvent containing water may be used.

The polymerization temperature during the reaction is not particularly limited, but is preferably −20 to 90° C., more preferably not more than 70° C. If the polymerization temperature is more than 90° C., secondary reactions easily occur and it becomes difficult to form the π-conjugated polymer compound having the desired structure.

The composite of the present invention containing a dopant and produced by the above production processes may be compounded directly to rubber, but it is also possible to process the composite of the present invention to remove the dopant and then compound it to the rubber. The method of removing the dopant from the composite of the present invention is not particularly limited. All sorts of known methods are possible. In general, it is sufficient to bring the composite of the present invention including the dopant into contact with a basic substance. It is possible to form the composite of the present invention, then directly add the basic substance to the reaction mixture containing the composite or isolate the composite of the present invention once, then the basic substance may be applied to the composite of the present invention in a vapor phase or liquid phase. As the basic substance, a primary, secondary, or tertiary alkylamine (e.g., mono-, di-, or tri-ethylamine), a hydrazine and its derivatives, an alkali metal hydroxide such as sodium hydroxide and potassium hydroxide, an alkali metal carbonate such as sodium carbonate, potassium carbonate, sodium hydrogencarbonate, or potassium hydrogencarbonate; ammonia; etc. may be mentioned.

Further, the composite of the present invention produced without addition of a dopant may also be compounded to the rubber.

The composite of the present invention this obtained may be dried at room temperature or may be dried under heating. The drying temperature is preferably 25 to 350° C., more preferably 60 to 300° C.

The starting rubber usable in the present invention is at least one rubber selected from natural rubber and a diene-based synthetic rubber. That is, any of natural rubber and the various diene-based synthetic rubbers may be used alone or in any mixture thereof. Examples of the diene-based synthetic rubber, are, polyisoprene rubber, polybutadiene rubber, styrene-butadiene rubber, butyl rubber, chlorobutyl rubber, chloroprene rubber. These rubbers are all illustrations. The present invention is not limited to the above rubbers.

The compounding amount of the composite of the present invention is 10 to 180 parts by weight, preferably 30 to 160 parts by weight, based upon 100 parts by weight of rubber. Further, the composite of the present invention may use a filler ordinarily compounded to rubber. As a suitable filler, silica may be mentioned. When using silica together, the addition amount of the silica is preferably 0 to 120 parts by weight, more preferably 0 to 80 parts by weight, based upon 100 parts by weight of rubber. Further, the ratio by weight of the silica and the composite of the present invention (silica:composite) is preferably from 1:20 to 20:1. The total addition amount of the composite of the present invention is preferably 10 to 180 parts by weight, more preferably 25 to 150 parts by weight, based upon 100 parts by weight of rubber.

Note that when silica is jointly used, it is preferable to use 3 to 20 parts by weight of a silane coupling agent based upon 100 parts by weight of silica. As preferable silane coupling agents, bis(3-triethoxysilylpropyl)tetrasulfide (Si69), bis(3-triethoxysilylpropyl)disulfide (Si75), etc. may be illustrated.

The rubber composition of the present invention may have suitably compounded to it a vulcanization agent, vulcanization accelerator, vulcanization retarder, activating agent, or other curing aid or an additive commonly used as a rubber aid such as an antioxidant, softening agent, plasticizer, or antiaging agent, together with the composite of the present invention.

As the vulcanization agent, sulfur or a sulfur donor vulcanization agent, for example, amine disulfide, a polymer-based polysulfide, or a sulfur/olefin adduct may be mentioned. Sulfur is preferable as the sulfur-based vulcanization agent. Further, it is also possible to use a peroxide as the vulcanization agent. The addition amount of the sulfur-based vulcanization agent is preferably 0.1 to 30 parts by weight, more preferably 0.5 to 10 parts by weight, still more preferably 1 to 6 parts by weight, based upon 100 parts by weight of the rubber. The addition amount of the peroxide is preferably 0.1 to 10 parts by weight, more preferably 0.5 to 5 parts by weight, based upon 100 parts by weight of rubber.

As the vulcanization accelerator, a thiazole type vulcanization accelerator such as dibenzothiazyldisulfide, N-t-butyl-2-benzothiazolylsulfenamide, or N-cyclohexyl-2-benzothiazolylsulfenamide; a thiuram type vulcanization accelerator such as tetramethylthiuramdisulfide; or dithiocarbamic acids, guanidines, thioureas, xantogenic acids, etc. may be mentioned. The vulcanization accelerator is preferably used in an amount of 0.1 to 10 parts by weight, more preferably 0.1 to 5 parts by weight, based upon 100 parts by weight of rubber.

Further, other rubber aids may be used in suitable amounts for the specific application. The suitable amount is 0.1 to 50 parts by weight, based upon 100 parts by weight of the rubber.

The rubber, the composite of the present invention, the other compounding agents, and the rubber aids may be mixed by a conventional mixing method such as mixing using a mixer such as a roll, internal mixer, or Banbury mixer.

The rubber composition according to the aspects of the present invention is not limited to a rubber composition for a tire such as a rubber composition for a tire tread and may be applied to other rubber products as well.

EXAMPLES

The present invention will now be further illustrated by, but is by no means limited to, the following Examples.

Examples 1 to 22 and Comparative Examples 1 to 2

Rubber compositions containing mixtures of the composites of the present invention (Composites 1 to 11) produced by the production process shown below and, as a comparison, carbon black (N339, $N_2SA=92$ $m^2/g$) in the ratios (parts by weight) shown in Table 1 and Table 2 were produced, then vulcanized at 160° C. for 20 minutes. The unvulcanized rubber compositions and vulcanized rubber compositions were tested as follows. The results are shown in Table 1 and Table 2.

Production of Composite 1 (Aniline Oxidative Condensate/Carbon Black Composite)

5 g of aniline (53.7 mmol), 5.6 g of hydrochloric acid (53.7 mmol), and 40 mg of ferrous sulfate were dissolved in 80 g of water. 100 g of carbon black (N339) was treated on the surface with this aniline aqueous solution, then the surface of the carbon black was treated with 20 g of water in which 5.2 g of hydrogen peroxide (53.7 mmol) was dissolved. The surface treated carbon black was dried at 110° C. for 24 hours to thereby obtain a composite of an aniline oxidative condensate and carbon black.

Production of Composite 2 (Aniline Oxidative Condensate/Carbon Black Composite)

5 g of aniline (53.7 mmol), 5.6 g of hydrochloric acid (53.7 mmol), 5.1 g of p-toluene sulfonic acid (26.8 mmol), and 40 mg of ferrous sulfate were dissolved in 80 g of water. 100 g of carbon black (N339) was treated on the surface with this aniline aqueous solution, then the surface of the carbon black was treated with 20 g of water in which 5.2 g of hydrogen peroxide (53.7 mmol) was dissolved. The surface treated carbon black was dried at 110° C. for 24 hours to thereby obtain a composite of an aniline oxidative condensate and carbon black.

Production of Composite 3 (Aniline Oxidative Condensate/Carbon Black Composite)

5 g of aniline (53.7 mmol), 5.6 g of hydrochloric acid (53.7 mmol), 7.8 g of sodium dodecylsulfonate (26.8 mmol), and 40 mg of ferrous sulfate were dissolved in 80 g of water. 100 g of carbon black (N339) was treated on the surface with this aniline aqueous solution, then the surface of the carbon black was treated with 20 g of water in which 5.2 g of hydrogen peroxide (53.7 mmol) was dissolved. The surface treated carbon black was dried at 110° C. for 24 hours to thereby obtain a composite of an aniline oxidative condensate and carbon black.

Production of Composite 4 (Aniline Oxidative Condensate/Carbon Black Composite)

5 g of aniline (53.7 mmol), 5.6 g of hydrochloric acid (53.7 mmol), 5.1 g of p-toluenesulfonic acid (26.8 mmol), and 40 mg of ferrous sulfate were dissolved in 100 g of water at 70° C. 5.2 g of hydrogen peroxide (53.7 mmol) was added to the aniline aqueous solution, then this was stirred at 70° C. for 4 hours to thereby obtain an aqueous solution in which the aniline oxidative condensate was uniformly dispersed. 100 g of carbon black (N339) was treated on the surface with this aqueous solution containing the aniline oxidative condensate, then was dried at 110° C. for 24 hours. The above procedure resulted in a composite of an aniline oxidative condensate and carbon black.

Production of Composite 5 (Aniline Oxidative Condensate/Carbon Black Composite)

5 g of aniline (53.7 mmol), 5.6 g of hydrochloric acid (53.7 mmol), 7.8 g of sodium dodecylsulfonate (26.8 mmol), and 40 mg of ferrous sulfate were dissolved in 100 g of water at 70° C. 5.2 g of hydrogen peroxide (53.7 mmol) was added to the aniline aqueous solution, then this was stirred at 70° C. for 4 hours to thereby obtain an aqueous solution in which the aniline oxidative condensate was uniformly dispersed. 100 g of carbon black (N339) was treated on the surface with this aqueous solution containing the aniline oxidative condensate, then was dried at 110° C. for 24 hours. The above procedure resulted in a composite of an aniline oxidative condensate and carbon black.

Production of Composite 6 (Aniline Oxidative Condensate/Carbon Black Composite)

100 g of carbon black (N339) was treated on the surface with 100 g of an aqueous solution containing aniline black homogeneously dispersed, comprised of 5 g of aniline (made by Tokyo Shikizai Kogyo, No. 25 Aniline Black) and 100 g of water, then was dried at 110° C. for 24 hours. The above procedure resulted in a composite of aniline black (aniline oxidative condensate) and carbon black.

Production of Composite 7 (Aniline Oxidative Condensate (Polyaniline)/Carbon Black Composite)

100 g of carbon black (N339) was treated on the surface with 100 g of a polyaniline aqueous solution (5% by weight polyaniline sulfonate aqueous solution made by Aldrichs), then was dried at 110° C. for 24 hours. The above procedure resulted in a composite of an aniline oxidative condensate (polyaniline) and carbon black.

Production of Composite 8 (Pyrrole Oxidative Condensate/Carbon Black Composite)

5 g of pyrrole (74.5 mmol), 6.5 g of sodium dodecylsulfonate (22.5 mmol), and 40 mg of ferrous sulfate were dissolved in 80 g of water. 100 g of carbon black (N339) was treated on the surface with this aqueous pyrrole solution, then the surface of the carbon black was treated with 20 g of water in which 7.2 g of hydrogen peroxide (74.5 mmol) was dissolved. The surface treated carbon black was dried at 110° C. for 24 hours to thereby obtain a composite of a pyrrole oxidative condensate and carbon black.

Production of Composite 9 (Pyrrole Oxidative Condensate/Carbon Black Composite)

5 g of pyrrole (74.5 mmol), 6.5 g of sodium dodecylsulfonate (22.5 mmol), and 40 mg of ferrous sulfate were dissolved in 100 g of water at 70° C. 7.2 g of hydrogen peroxide (74.5 mmol) was added to the pyrrole aqueous solution, then this was stirred at 70° C. for 4 hours to thereby obtain an aqueous solution in which the pyrrole oxidative condensate was uniformly dispersed. 100 g of carbon black (N339) was treated on the surface with this aqueous solution containing the pyrrole oxidative condensate, then was dried at 110° C. for 24 hours. The above procedure resulted in a composite of a pyrrole oxidative condensate and carbon black.

Production of Composite 10 (Thiophene Oxidative Condensate/Carbon Black Composite)

5 g of thiophene (59.4 mmol), 5.1 g of sodium dodecylsulfonate (17.7 mmol), and 40 mg of ferrous sulfate were dissolved in 80 g of water. 100 g of carbon black (N339) was treated on the surface with this thiophene aqueous solution, then the surface of the carbon black was treated with 20 g of water in which 5.8 g of hydrogen peroxide (59.4 mmol) was dissolved. The surface treated carbon black was dried at 110° C. for 24 hours to thereby obtain a composite of a thiophene oxidative condensate and carbon black.

Production of Composite 11 (Thiophene Oxidative Condensate/Carbon Black Composite)

5 g of thiophene (53.7 mmol), 5.1 g of sodium dodecylsulfonate (17.7 mmol), and 40 mg of ferrous sulfate were dissolved in 100 g of water at 70° C. 5.8 g of hydrogen peroxide (59.4 mmol) was added to the thiophene aqueous solution, then this was stirred at 70° C. for 4 hours to thereby obtain an aqueous solution in which the thiophene oxidative condensate was uniformly dispersed. 100 g of carbon black (N339) was treated on the surface with this aqueous solution containing the thiophene oxidative condensate, then was dried at 110° C. for 24 hours. The above procedure resulted in a composite of a thiophene oxidative condensate and carbon black.

Mooney Viscosity

This was measured at 100° C. according to JIS K6300. The smaller the value, the more improved the processability and the better.

Scorch Time

This was measured at 125° C. according to JIS K6300.

Vulcanization Time

The time (minutes) until reaching a vulcanization degree of 95% at 125° C. was measured according to JIS K6300 and made the vulcanization time. The smaller the vulcanization time, the faster the vulcanization speed.

Tensile Properties

The 100% modulus (MPa), 300% modulus (MPa), breakage strength (MPa), and elongation at break (%) were measured according to JIS K6251.

Tan δ

The viscoelastic properties at 0° C. and 60° C. were measured using a viscoelasticity spectrometer made by Toyo Seiki Seisakusho under conditions of an initial strain of 10%, an amplitude of 2%, and a frequency of 20 Hz.

Abrasion Resistance

The amount of abrasion loss as measured using a Lambourn abrasion tester (made by Iwamoto Seisakusho) under conditions of a load of 5 kg, a slip of 25%, a time of 4 minutes, and room temperature was shown indexed to Comparative Example 1 in Table 1 and Comparative Example 2 in Table 2 as 100. Note that the larger the value, the better the abrasion resistance indicated.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 |
|---|---|---|---|---|---|---|---|---|---|---|---|---|
| SBR 1 | 137.5 | 137.5 | 137.5 | 137.5 | 137.5 | 137.5 | 137.5 | 137.5 | 137.5 | 137.5 | 137.5 | 137.5 |
| Composite 1 | 80 | — | — | — | — | — | — | — | — | — | — | — |
| Composite 2 | — | 80 | — | — | — | — | — | — | — | — | — | — |
| Composite 3 | — | — | 80 | — | — | — | — | — | — | — | — | — |
| Composite 4 | — | — | — | 80 | — | — | — | — | — | — | — | — |
| Composite 5 | — | — | — | — | 80 | — | — | — | — | — | — | — |
| Composite 6 | — | — | — | — | — | 80 | — | — | — | — | — | — |
| Composite 7 | — | — | — | — | — | — | 80 | — | — | — | — | — |
| Composite 8 | — | — | — | — | — | — | — | 80 | — | — | — | — |
| Composite 9 | — | — | — | — | — | — | — | — | 80 | — | — | — |
| Composite 10 | — | — | — | — | — | — | — | — | — | 80 | — | — |
| Composite 11 | — | — | — | — | — | — | — | — | — | — | 80 | — |
| Carbon black | — | — | — | — | — | — | — | — | — | — | — | 80 |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 | 1 |
| Aromatic oil | 12.5 | 12.5 | 12.5 | 12.5 | 12.5 | 12.5 | 12.5 | 12.5 | 12.5 | 12.5 | 12.5 | 12.5 |
| Vulcanization accelerator | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 |
| Mooney viscosity | 52 | 53 | 51 | 54 | 49 | 48 | 52 | 50 | 54 | 53 | 52 | 53 |
| Scorch time (min) | 47 | 48 | 46 | 49 | 47 | 48 | 49 | 45 | 47 | 46 | 48 | 45 |
| Vulcanization time (min) | 11 | 12 | 13 | 10 | 11 | 13 | 11 | 12 | 13 | 11 | 10 | 12 |
| Tensile properties |  |  |  |  |  |  |  |  |  |  |  |  |
| 100% modulus (MPa) | 2.3 | 2.4 | 2.3 | 2.3 | 2.4 | 2.5 | 2.4 | 2.3 | 2.2 | 2.1 | 2.3 | 2.1 |
| 300% modulus (MPa) | 10.3 | 10.4 | 10.6 | 10.4 | 10.5 | 10.3 | 10.7 | 10.5 | 10.4 | 10.3 | 10.4 | 10.3 |
| Tensile strength at break (MPa) | 20.4 | 20.5 | 20.7 | 20.9 | 20.4 | 20.6 | 20.8 | 20.7 | 20.3 | 20.4 | 20.2 | 20.2 |
| Elongation at break (%) | 558 | 555 | 550 | 557 | 552 | 553 | 551 | 554 | 554 | 550 | 549 | 551 |
| tanδ (0° C.) | 0.479 | 0.480 | 0.478 | 0.481 | 0.483 | 0.478 | 0.482 | 0.478 | 0.479 | 0.480 | 0.481 | 0.478 |
| tanδ (60° C.) | 0.242 | 0.240 | 0.245 | 0.246 | 0.239 | 0.244 | 0.241 | 0.242 | 0.239 | 0.240 | 0.242 | 0.294 |
| Abrasion resistance (index) | 103 | 104 | 102 | 103 | 104 | 105 | 103 | 100 | 101 | 103 | 104 | 100 |

TABLE 2

|  | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Comp. Ex. 2 |
|---|---|---|---|---|---|---|---|---|---|---|---|---|
| SBR 2 | 50 | 50 | 50 | 50 | 50 | 50 | 50 | 50 | 50 | 50 | 50 | 50 |
| Natural rubber | 50 | 50 | 50 | 50 | 50 | 50 | 50 | 50 | 50 | 50 | 50 | 50 |
| Composite 1 | 50 | — | — | — | — | — | — | — | — | — | — | — |
| Composite 2 | — | 50 | — | — | — | — | — | — | — | — | — | — |
| Composite 3 | — | — | 50 | — | — | — | — | — | — | — | — | — |
| Composite 4 | — | — | — | 50 | — | — | — | — | — | — | — | — |

TABLE 2-continued

|  | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Comp. Ex. 2 |
|---|---|---|---|---|---|---|---|---|---|---|---|---|
| Composite 5 | — | — | — | — | 50 | — | — | — | — | — | — | — |
| Composite 6 | — | — | — | — | — | 50 | — | — | — | — | — | — |
| Composite 7 | — | — | — | — | — | — | 50 | — | — | — | — | — |
| Composite 8 | — | — | — | — | — | — | — | 50 | — | — | — | — |
| Composite 9 | — | — | — | — | — | — | — | — | 50 | — | — | — |
| Composite 10 | — | — | — | — | — | — | — | — | — | 50 | — | — |
| Composite 11 | — | — | — | — | — | — | — | — | — | — | 50 | — |
| Carbon black | — | — | — | — | — | — | — | — | — | — | — | 50 |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Antioxidant | 1 | 1 | 1 | 1 | 1 | 1 | 1 | 1 | 1 | 1 | 1 | 1 |
| Aromatic oil | 50 | 50 | 50 | 50 | 50 | 50 | 50 | 50 | 50 | 50 | 50 | 50 |
| Vulcanization accelerator | 1.5 | 1.5 | 1.5 | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 | 2 | 2 | 2 |
| Mooney viscosity | 56 | 57 | 55 | 56 | 58 | 57 | 55 | 58 | 57 | 56 | 57 | 58 |
| Scorch time (min) | 23 | 25 | 23 | 22 | 23 | 24 | 25 | 22 | 23 | 24 | 25 | 22 |
| Vulcanization time (min) | 10 | 9 | 10 | 10 | 11 | 9 | 10 | 10 | 8 | 9 | 10 | 10 |
| Tensile properties |  |  |  |  |  |  |  |  |  |  |  |  |
| 100% modulus (MPa) | 3.4 | 3.3 | 3.4 | 3.4 | 3.5 | 3.3 | 3.4 | 3.3 | 3.2 | 3.3 | 3.5 | 3.3 |
| 300% modulus (MPa) | 14.8 | 14.9 | 14.8 | 15 | 14.8 | 14.9 | 15.1 | 15.2 | 15 | 15 | 14.9 | 14.9 |
| Tensile strength at break (MPa) | 22.3 | 22.6 | 22.4 | 22.5 | 22.7 | 22.4 | 22.8 | 22.9 | 22.8 | 23 | 22.7 | 22.5 |
| Elongation at break (%) | 430 | 432 | 425 | 429 | 430 | 432 | 428 | 430 | 429 | 432 | 435 | 427 |
| tanδ (0° C.) | 0.587 | 0.586 | 0.588 | 0.589 | 0.586 | 0.587 | 0.587 | 0.587 | 0.587 | 0.588 | 0.586 | 0.586 |
| tanδ (60° C.) | 0.148 | 0.145 | 0.152 | 0.149 | 0.147 | 0.146 | 0.145 | 0.153 | 0.142 | 0.143 | 0.149 | 0.182 |
| Abrasion resistance (index) | 100 | 100 | 103 | 101 | 102 | 103 | 104 | 102 | 100 | 100 | 100 | 100 |

The following were used for the components in Table 1 and Table 2:

SBR 1: Solution polymerized SBR, Nipol 1712, made by Nippon Zeon, oil extended product containing 37.5 parts by weight of aromatic oil, based upon 100 parts by weight of rubber SBR 2: Solution polymerized SBR, Nipol 1712, made by Nippon Zeon Carbon black: Carbon Black N339, made by Tokai Carbon, nitrogen specific area ($N_2SA$)=92 $m^2/g$ Antioxidant: (N-phenyl-N'-(1,3-dimethylbutyl)-p-phenylenediamine), made by Bayer.

Vulcanization accelerator: N-cyclohexyl-2-benzothiazolylsulfenamide, made by Toyo Kagaku.

From Table 1 and Table 2, it is clear that, compared with the rubber compositions, in which carbon black was compounded shown in Comparative Examples 1 and 2, the rubber compositions of Examples 1 to 22 including Composites 1 to 11 were reduced in the tan δ (60° C.), while maintained or increased in the tan δ (0° C.), and were improved in the low rolling resistance, without reducing the wet skid resistance. On the other hand, regarding the processability (Mooney viscosity and scorch time), tensile properties, and abrasion resistance, the rubber compositions of Examples 1 to 22 including Composites 1 to 11 maintained the properties of rubber compositions in which carbon black was blended shown in Comparative Examples 1 and 2 and were held down in terms of reduction of the mechanical properties.

Further, Composites 1 to 11 could be easily produced without a complicated production process with a large number of production steps as with the above-mentioned conventional compounding agents.

As explained above, according to the present invention, by compounding a composite composed of an oxidative condensate obtained by oxidative condensation of a π-electron aromatic compound and carbon black to a rubber composition, it is possible to obtain an excellent wet skid resistance and low rolling resistance by an easy-to-produce compounding agent.

Examples 23 to 30 and Comparative Example 3

Rubber compositions containing of mixtures of composites of π-conjugated polymer and carbon black (Composites 12 to 19) produced by the process of production shown below and carbon black and, as a comparison, carbon black in the ratios (parts by weight) shown in Table 3 were produced, then vulcanized at 160° C. for 20 minutes. These were tested as follows. The results are shown in Table 3.

Production of Composite 12 (Polyaniline/Carbon Black Composite)

2 g of aniline (21.5 mmol), 2.24 g of hydrochloric acid (21.5 mmol), and 7.01 g of dodecylbenzenesulfonic acid (21.5 mmol) were added to 500 ml of water. 100 g of carbon black (N220) was added to the obtained aqueous solution while stirring vigorously. The solution was cooled to 5° C., then 5.89 g of ammonium persulfate (25.8 mmol) was added and the mixture stirred for 5 hours while keeping the reaction temperature below 10° C. After the end of the reaction, the black powder in the reaction solution was obtained by filtration and washed with water and methanol. The filtrate and the washings when filtering the composite comprised of the polyaniline and carbon black from the reaction solution did not exhibit the green coloring derived from polyaniline, so it was learned that the reaction was complete and the polyaniline in the doped state formed a composite with the carbon black quantitatively. Further, the composite obtained was dried at 80° C. for 8 hours to obtain a composite of polyaniline in the doped state and carbon black. The amount of the polyaniline in the composite was 2% by weight.

Production of Composite 13 (Polyaniline/Carbon Black Composite)

2 g of aniline (21.5 mmol), 2.24 g of hydrochloric acid (21.5 mmol), and 7.01 g of dodecylbenzenesulfonic acid (21.5 mmol) were added to 500 ml of water. 100 g of carbon black (N220) was added to the obtained aqueous solution while stirring vigorously. The solution was cooled to 5° C., then 5.89 g of ammonium persulfate (25.8 mmol) was added. The mixture was stirred for 5 hours while keeping the reaction temperature below 10° C. After the end of the reaction, sodium carbonate powder was added until the reaction solution exhibited basicity by pH test paper, then the mixture was stirred for 4 hours. The black powder in the reaction solution was obtained by filtration and washed with water and methanol. The filtrate and the washings when filtering the composite comprised of the polyaniline and carbon black from the reaction solution did not exhibit the blue coloring derived from polyaniline in the undoped state, so it was learned that the reaction was complete and the polyaniline in the undoped state formed a composite with the carbon black quantitatively. Further, the composite obtained was dried at 80° C. for 8 hours to obtain a composite of polyaniline in the undoped state and carbon black. The amount of the polyaniline in the composite was 2% by weight.

Production of Composite 14 (Polyaniline/Carbon Black Composite)

The same procedure as with Composite 12 was followed to obtain a composite comprised of polyaniline and carbon black except for changing the amounts of the aniline, hydrochloric acid, dodecylbenzenesulfonic acid, and ammonium persulfate used for the production of Composite 12 to 5 g (53.7 mmol), 5.6 g (53.7 mmol), 17.5 g (53.7 mmol), and 14.7 g (64.4 mmol), respectively. The filtrate and the washings when filtering the composite comprised of the polyaniline and carbon black from the reaction solution did not exhibit the green coloring derived from polyaniline in the undoped state, so it was learned that the polyaniline in the doped state formed a composite with the carbon black quantitatively. Further, the composite obtained was dried at 80° C. for 8 hours to obtain a composite of polyaniline in the undoped state and carbon black. The amount of the polyaniline in the composite was 5% by weight.

Production of Composite 15 (Polyaniline/Carbon Black Composite)

The same procedure as with Composite 13 was followed to obtain a composite comprised of polyaniline and carbon black except for changing the amounts of the aniline, hydrochloric acid, dodecylbenzenesulfonic acid, and ammonium persulfate used for the production of Composite 13 to 5 g (53.7 mmol), 5.6 g (53.7 mmol), 17.5 g (53.7 mmol), and 14.7 g (64.4 mmol), respectively. The filtrate and the washings when filtering the composite comprised of the polyaniline and carbon black from the reaction solution did not exhibit the green coloring derived from polyaniline in the undoped state, so it was learned that the reaction was complete and the polyaniline in the undoped state formed a composite with the carbon black quantitatively. Further, the composite obtained was dried at 80° C. for 8 hours to obtain a composite of polyaniline in the undoped state and carbon black. The amount of the polyaniline in the composite was 5% by weight.

Production of Composite 16 (Polyaniline/Carbon Black Composite)

2 g of aniline (21.5 mmol), 2.24 g of hydrochloric acid (21.5 mmol), and 6.19 g of sodium dodecylsulfonate (21.5 mmol) were added to 200 ml of water and stirred well, then the aqueous solution was cooled to under 5° C. While holding the reaction solution at under 5° C., 4.90 g of ammonium persulfate (21.5 mmol) was added while stirring and a reaction caused for 5 hours. Along with the progress of the reaction, a uniform green solution was obtained. This uniform polyaniline aqueous solution was added to 100 g of carbon black (N220) while stirring vigorously. Part of the obtained composite of polyaniline and carbon black was taken and washed with water and methanol, whereupon the green coloring derived from polyaniline was not observed, so it was learned that the reaction was complete and the polyaniline in the doped state formed a composite with the carbon black quantitatively. The remaining composite comprised of the polyaniline and carbon black was dried at 80° C. for 8 hours to obtain a composite of polyaniline in the doped state and carbon black. The amount of the polyaniline in the composite was 2% by weight.

Production of Composite 17 (Polyaniline/Carbon Black Composite)

The same procedure as for Composite 16 was followed to obtain a composite containing polyaniline and carbon black except for changing the amounts of the water, aniline, hydrochloric acid, sodium dodecylsulfonate, and ammonium persulfate used for the production of the Composite 16 to 500 ml, 5 g (53.7 mmol), 5.6 g (53.7 mmol), 15.5 g (53.7 mmol), and 12.3 g (53.7 mmol), respectively. Part of the obtained composite of polyaniline and carbon black was taken and washed with water and methanol, whereupon the green coloring derived from polyaniline was not observed, so it was learned that the reaction was complete and the polyaniline in the doped state formed a composite with the carbon black quantitatively. The remaining composite comprised of the polyaniline and carbon black was dried at 80° C. for 8 hours to obtain a composite of polyaniline in the doped state and carbon black. The amount of the polyaniline in the composite was 5% by weight.

Production of Composite 18 (Polypyrrole/Carbon Black Composite)

2 g of pyrrole (29.8 mmol) and 9.73 g of dodecylbenzenesulfonic acid (29.8 mmol) were added to 500 ml of water. 100 g of carbon black (N220) was added to the obtained aqueous solution while stirring vigorously. The solution was cooled to 5° C., then 8.16 g of ammonium persulfate (35.8 mmol) was added and the mixture stirred for 5 hours while keeping the reaction temperature below 10° C. After the end of the reaction, the black powder in the reaction solution was obtained by filtration and washed with water and methanol. The filtrate and the washings when filtering the composite comprised of the polyaniline and carbon black from the reaction solution did not exhibit the green-brown coloring derived from polypyrrole, so it was learned that the reaction was complete and the polypyrrole in the doped state formed a composite with the carbon black quantitatively. Further, the obtained composite was dried at 80° C. for 8 hours to obtain a composite of polypyrrole in the doped state and carbon black. The amount of the polypyrrole in the composite was 2% by weight.

Production of Composite 19 (Polypyrrole/Carbon Black Composite)

2 g of pyrrole (29.8 mmol) and 9.73 g of dodecylbenzenesulfonic acid (29.8 mmol) were added to 500 ml of water. 100 g of carbon black (N220) was added to the obtained aqueous solution while stirring vigorously. The solution was cooled to 5° C., then 8.16 g of ammonium persulfate (35.8 mmol) was added. The mixture was stirred for 5 hours while keeping the reaction temperature below 10° C. After the end of the reaction, sodium carbonate powder was added until the reaction solution exhibited basicity by pH test paper, then the mixture was stirred for 4 hours. The black powder in the reaction solution was obtained by filtration and washed with water and methanol. The filtrate and the washings when filtering the composite comprised of the polypyrrole and carbon black from the reaction solution did not exhibit the brown coloring derived from polypyrrole in the undoped state, so it was learned that the reaction was complete and the polypyrrole in the undoped state formed a composite with the carbon black quantitatively. Further, the composite obtained was dried at 80° C. for 8 hours to obtain a composite of polypyrrole in the undoped state and carbon black. The amount of the polypyrrole in the composite was 2% by weight.

Note that the Mooney viscosity, scorch time, vulcanization time, tensile properties, and tan δ were measured by the same methods as explained above.

Note that the abrasion resistance is the abrasion loss measured using a Lambourn abrasion tester (made by Iwamoto Seisakusho) under conditions of a load of 5 kg, a slip of 25%, a time of 4 minutes, and room temperature indexed to the value of Comparative Example 3 as 100.

Note that the larger the value, the better the abrasion resistance shown.

Comparative Example 3, the rubber compositions of Examples 23 to 30 including composites of π-conjugated polymers and carbon black (Composites 12 to 19) were reduced in the tan δ (60° C.) while maintained or increased in the tan δ (0° C.) and were improved in the low rolling resistance without the wet skid resistance being reduced. On the other hand, regarding the processability (Mooney viscosity and scorch time), tensile properties, and abrasion resistance, the rubber compositions of Examples 23 to 30 including Composites 12 to 19 maintained the properties of a rubber composition in which carbon black was blended shown in Comparative Example 3 and were held down in terms of reduction of the mechanical properties.

Further, Composites 12 to 19 could be easily produced without a complicated production process with a large number of production steps as with the above-mentioned conventional compounding agents.

As explained above, according to the present invention, by compounding a composite composed of a π-conjugated polymer compound and carbon black to a rubber composition, it is possible to obtain an excellent wet skid resistance and low rolling resistance by an easy-to-produce compounding agent.

What is claimed is:

1. A pneumatic tire using, for a tire tread, a rubber composition comprising (i) 100 parts by weight of a rubber

TABLE 3

| | Ex. 23 | Ex. 24 | Ex. 25 | Ex. 26 | Ex. 27 | Ex. 28 | Ex. 29 | Ex. 30 | Comp. Ex. 3 |
|---|---|---|---|---|---|---|---|---|---|
| SBR 3 | 137.5 | 137.5 | 137.5 | 137.5 | 137.5 | 137.5 | 137.5 | 137.5 | 137.5 |
| Composite 12 | 80 | — | — | — | — | — | — | — | — |
| Composite 13 | — | 80 | — | — | — | — | — | — | — |
| Composite 14 | — | — | 80 | — | — | — | — | — | — |
| Composite 15 | — | — | — | 80 | — | — | — | — | — |
| Composite 16 | — | — | — | — | 80 | — | — | — | — |
| Composite 17 | — | — | — | — | — | 80 | — | — | — |
| Composite 18 | — | — | — | — | — | — | 80 | — | — |
| Composite 19 | — | — | — | — | — | — | — | 80 | — |
| Carbon black | — | — | — | — | — | — | — | — | 80 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antioxidant | 1 | 1 | 1 | 1 | 1 | 1 | 1 | 1 | 1 |
| Aromatic oil | 12.5 | 12.5 | 12.5 | 12.5 | 12.5 | 12.5 | 12.5 | 12.5 | 12.5 |
| Vulcanization accelerator | 1.5 | 1.5 | 1.5 | 1.5 | 1.5 | 1.5 | 1.5 | 1.5 | 1.5 |
| Sulfur | 2 | 2 | 2 | 2 | 2 | 2 | 2 | 2 | 2 |
| Mooney viscosity | 48 | 46 | 49 | 47 | 46 | 48 | 47 | 47 | 48 |
| Scorch time (min) | 16.5 | 17.2 | 16.8 | 16.5 | 17.2 | 16.8 | 16.7 | 16.6 | 16.5 |
| Vulcanization time (min) | 8.96 | 9.04 | 9.12 | 9.93 | 8.87 | 9.08 | 9.42 | 9.56 | 10.1 |
| Tensile properties | | | | | | | | | |
| 100% modulus (MPa) | 2.32 | 2.35 | 2.28 | 2.34 | 2.27 | 2.34 | 2.37 | 2.34 | 2.22 |
| 300% modulus (MPa) | 10.3 | 10.4 | 10.6 | 10.4 | 10.5 | 10.3 | 10.7 | 10.5 | 10.6 |
| Tensile strength at break (MPa) | 20.9 | 20.5 | 20.7 | 20.9 | 20.4 | 20.6 | 20.8 | 20.7 | 20.7 |
| Elongation at break (%) | 545 | 549 | 550 | 543 | 549 | 549 | 551 | 547 | 548 |
| tan δ (0° C.) | 0.532 | 0.531 | 0.535 | 0.536 | 0.538 | 0.537 | 0.537 | 0.533 | 0.531 |
| tan δ (60° C.) | 0.295 | 0.298 | 0.259 | 0.262 | 0.293 | 0.257 | 0.258 | 0.259 | 0.325 |
| Abrasion resistance (index) | 102 | 102 | 104 | 103 | 104 | 104 | 105 | 102 | 100 |

The following were used for the components in Table 3:
SBR 3: Solution polymerized SBR, Nipol 1712, made by Nippon Zeon
Carbon black: Carbon Black N220, made by Tokai Carbon, nitrogen specific area (N$_2$SA)=115 m$^2$/g
Antioxidant: (N-phenyl-N'-(1,3-dimethylbutyl)-p-phenylenediamine), made by Bayer.
Vulcanization accelerator: N-cyclohexyl-2-benzothiazolylsulfenamide, made by Toyo Kagaku.
From Table 3, it is clear that, compared with the rubber composition in which carbon black was blended shown in and (ii) 10 to 180 parts by weight of a composite composed of an oxidative condensate obtained by oxidative condensation of a π-electron aromatic compound selected from the group consisting of aniline, 2-methyl-aniline, naphthylamine, phenylenediamine, naphthylenediamine, triaminobenzene, triaminonaphthalene, pyrrole, indole, carbazole, thiophene, selenophene, imidazole, furan and their derivatives and carbon black.

2. A pneumatic tire using, for a tire tread, a rubber composition comprising (i) 100 parts by weight of a rubber and (ii) 10 to 180 parts by weight of a π-conjugated polymer compound selected from the group consisting of polyaniline, poly(2-methyl-aniline), polypyrrole, polythiophene, and carbon black.

3. A pneumatic tire as claimed in claim 1, wherein the concentration of the oxidative condensate in the composite is 0.01 to 30% by weight.

4. A pneumatic tire as claimed in claim 1, wherein the composite is composed of the oxidative condensate coated on the surface of the carbon black.

5. A pneumatic tire as claimed in claim 1, wherein the π-electron aromatic compound is at least one compound selected from the group consisting of aniline, 2-methyl-aniline, thiophene and pyrrole.

6. A pneumatic tire as claimed in claim 2, wherein the π-conjugated polymer is at least one compound selected from the group consisting of polyaniline, poly(2-methyl-aniline), polypyrrole and polythiophene.

7. A pneumatic tire as claimed in claim 2, wherein the amount of the π-conjugated polymer bonded to the composite comprising the π-conjugated polymer and carbon black is 0.01 to 30% by weight.

8. A pneumatic tire as claimed in claim 2, wherein the composite is composed of the π-conjugated polymer coated on the surface of the carbon black.

* * * * *